Patented Jan. 23, 1923.

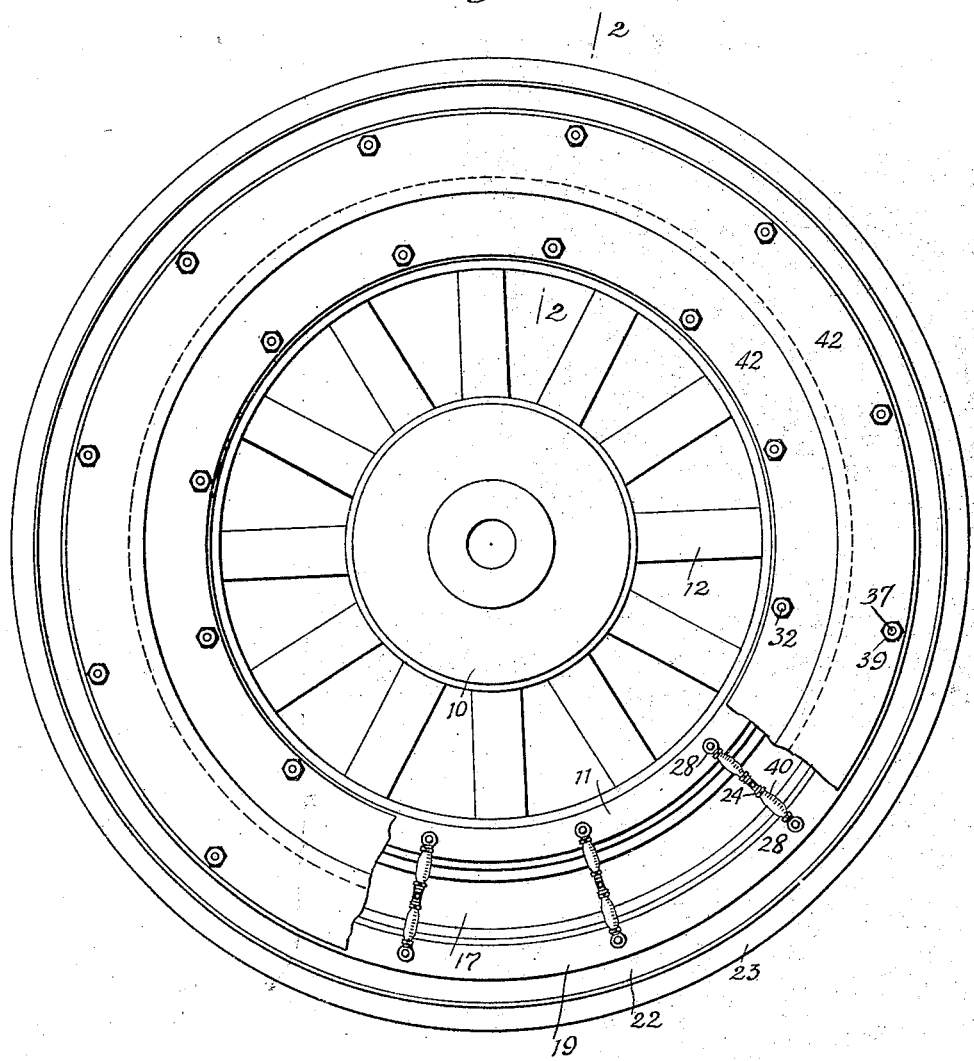

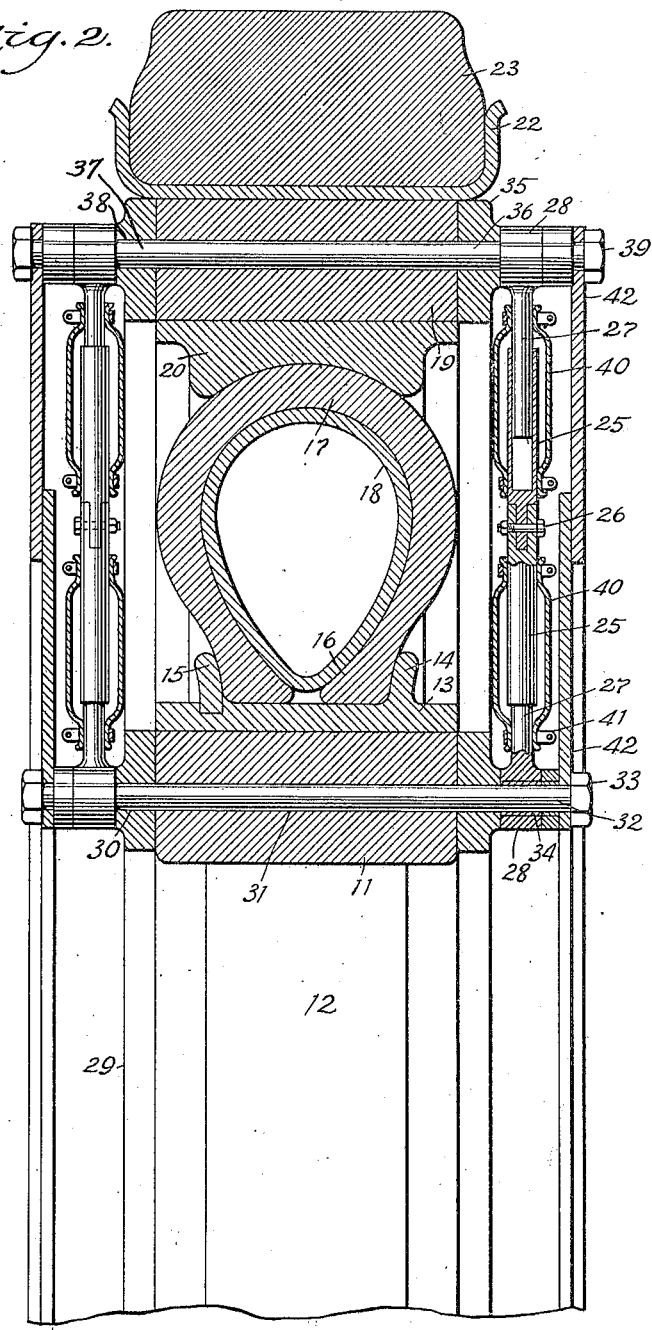

1,443,319

UNITED STATES PATENT OFFICE.

ALFRED FREUND, OF ST. LOUIS, MISSOURI.

VEHICLE WHEEL.

Application filed September 28, 1922. Serial No. 591,122.

*To all whom it may concern:*

Be it known that I, ALFRED FREUND, a citizen of the United States of America, and a resident of the city of St. Louis, in the State of Missouri, have invented a new and Improved Vehicle Wheel, of which the following is a description.

This invention has relation to vehicles and particularly relates to pneumatic resilient wheels for motor vehicles, the invention being in the nature of an improvement on the subject matter of a patent granted to me August 8, 1916, Number 1,194,163 and of an application filed by me June 20, 1922, Serial No. 569,605. The wheel forming the subject of the patent and application is characterized by an inflated tire structure isolated from contact with the road in order to minimize wearing on said structure and to preclude the possibility of punctures or the like.

The present invention has for its object to improve the tire structure with respect to the links connecting the inner and outer fellies and the provision of housing elements associated with the fellies and their connecting means.

The nature of the present invention and its distinguishing features and advantages will clearly appear as the description proceeds.

Reference is to be had to the accompanying drawings forming a part of this specification, it being understood that the drawings are merely illustrative of one example of the invention.

Figure 1 is a side elevation of a wheel constructed in accordance with the invention;

Figure 2 is a fragmentary enlarged radial sectional view taken approximately on the line 2—2 of Figure 1;

Referring to the drawings by characters of reference, the wheel embodies a hub 10 and an inner felly 11 which is supported from the hub preferably by radially disposed spokes 12. The outer periphery of the inner felly 11 is covered by a rim 13 which includes an integral annular bead 14 and a lock ring 15 between which the beads 16 of a tire shoe or casing 17 are adapted to be arranged after the inner inflatable tube 18 is disposed within the shoe or casing. The wheel further embodies an outer felly 19, the inner periphery of which is formed with an annular rim 20 having a central circumferential concave seat 21 which is designed to snugly receive and fit the outer central periphery of the shoe or casing 17 whereby the outer felly is normally concentrically supported from the inner felly 11. The outer periphery of the outer felly 19 is provided with a channeled rim 22 within which a solid outer tire 23 is arranged to provide a tread surface for the wheel.

In accordance with the invention the means for preventing lateral displacement of the outer felly and to compensate for the eccentric disposition of the outer felly with respect to the inner when the pneumatic tire is compressed, said inner and outer fellies are coupled by a novel link assemblage 24 at each side. The links consist of a pair of tubular sections 25 disposed radially end to end, the tubular elements of a pair being connected by transverse bolts or pins 26. Telescoping in each tubular section 25 of a pair of links are solid members 27, each provided with an eye 28 at one end.

The eyes 28 of a pair of members 27 are disposed on opposite sides of the inner felly 11 and are spaced therefrom by bearing rings 29 which are provided with apertures 30 in alignment with the eyes 28. The felly 11 is transversely apertured as at 31 and the bolts 32 are passed through the apertures 31, the aligned eyes 28 and the apertures 30 in the rings 29. Nuts 33 are applied to the opposite ends of the bolts 32 to retain the rings 29 and members 27 in place. Preferably the eyes 28 of the inner members 27 are lined with bushings 34 which are of slightly greater width than the eyes 28 whereby the members 27 are attached to the inner felly 11 for free pivotal movement. The outer solid members 27 of the respective pairs have their eyes 28 in alignment as in the case of the inner members 27 and are spaced therefrom by the bearing rings 35 which are apertured as at 36 to receive the transverse bearing bolt 37 which passes through a transverse aperture 38 in the outer felly 19, the apertures 36 of the bearing rings and the aligned eyes 28 of the members 27. The opposite ends of the bolts 37 have mounted thereon nuts 39 which attach the rings 35 and members 27 in place. The free ends of the tubular members 25 telescopically receive the free extremities of the solid members 27. A flexible and extensible tubular cover 40 is attached by clips 41 at its opposite ends to the members 25 and 27 respectively whereby the telescopic joint in the links 24 are protected from the possible entry of water, moisture, dust, dirt or other foreign matter, which would tend to rust or otherwise hamper the proper operation of the links. Sleeves 40 serve to hold a lubricant.

In operation the weight of the vehicle is resiliently supported on the pneumatic tire structure, while the tread surface of the tire structure is isolated from the road to minimize the wear thereon and positively preclude the possibility of punctures or stone bruises. As the vehicle travels over the road bed, the inner felly will be disposed slightly eccentric to the outer felly under the weight of the vehicle and it will be appreciated that the connecting links 24 will compensate for the relative movements between the two fellies in view of the fact that said links are of a telescopic nature and are pivoted at their opposite extremities to the fellies, and to each other.

When the tire deteriorates, the same may be replaced by removing the links 24 and the retaining ring 15. The inner tube may be inflated in the usual manner to the pressure desired, while the outer solid tire tread 23 may be replaced when worn. From the foregoing it will be seen that a highly efficient, practically puncture proof pneumatic wheel structure has been provided which functions in precisely the same manner as the usual wheel equipped with a pneumatic tire tread.

I provide housing plates 42 at each side of the felly and tire assemblage in the form of annular flat rings, a pair at each side, the plates of a pair overlapping and having slidable engagement to exclude dust and dirt. The inner and outer plates of a pair are secured by the bolts 32 and 37, the arrangement causing the plates to yield relatively to each other as the tire collapses.

I would state in conclusion that while the illustrated example constitutes a practical embodiment of my invention, I do not limit myself strictly to the exact details herein illustrated, since, manifestly, the same can be considerably varied without departure from the spirit of the invention as defined in the appended claims.

Having thus described my invention, I claim:

1. In a resilient wheel, an inner felly, an outer felly, resilient means interposed between said fellies, and a plurality of telescoping links arranged outside of the fellies, each link composed of a pair of telescoping sections, and members telescoping in said sections and secured to the respective fellies.

2. In a resilient wheel, an inner felly, an outer felly, resilient means interposed between said fellies, transverse bolts passing through the respective fellies, radially disposed members at the sides of the fellies and secured by said bolts and aligned radially, the members at each side to be disposed in pairs and the members of a pair aligning, and tubular elements disposed in radial alignment and connected together, said elements having telescoping connection with said members.

3. In a resilient wheel, an inner felly, an outer felly, resilient means interposed between said fellies, transverse bolts passing through the respective fellies, radially disposed telescoping elements secured by said bolts and thereby forming with the bolts a connection between the fellies, and a housing consisting of annular flat rings outside of said telescoping elements, said rings secured to the bolts of the respective fellies and overlapping.

4. In a resilient wheel, an inner felly, an outer felly, members pivotally secured to the respective fellies and in radial alinement with each other, and elements interposed between and coaxial with said members and telescoping the same, said interposed elements being pivotally connected with each other.

ALFRED FREUND.